INVENTORS.
Harry C. Francke
Emanuel G. Laggis
BY
ATTORNEY.

Jan. 17, 1967  H. C. FRANCKE ETAL  3,298,452
WEIGHT RESPONSIVE DISPENSER

Filed June 11, 1965

INVENTORS.
Harry C. Francke
BY Emanuel G. Laggis

ATTORNEY.

United States Patent Office 3,298,452
Patented Jan. 17, 1967

3,298,452
WEIGHT RESPONSIVE DISPENSER
Harry C. Francke, Oak Ridge, and Emanuel G. Laggis, Knoxville, Tenn., assignors to the United States of America as represented by the United States Atomic Energy Commisssion
Filed June 11, 1965, Ser. No. 463,410
2 Claims. (Cl. 177—120)

This invention relates to mechanical powder dispensers and more particularly to a powder dispenser for the controlled withdrawal of powder from the lower extremity of a tower reactor.

The large-scale production of uranium tetrafluoride ($UF_4$) may be accomplished by the hydrogen reduction of uranium hexafluoride gas in a tower reactor. During the reaction the uranium tetrafluoride powder falls to the bottom of the tower reactor.

Heretofore, in the prior art, the means for removing the powder from the bottom of the reactor comprised a screw feeder attached to the bottom of the reaction tower. Screw feeder valves are expensive to fabricate and install and also entail excessive maintenance expenses. A further undesirable feature of screw reactor valves is their tendency to allow escape of gaseous reactants and/or products from the tower reactor proper. Escape of gases from the reactor via the screw feeder occurs because of the inability of the rotating screw to create a gas-tight seal within its housing. These escaping gases, in the main, constitute hydrogen fluoride and/or hydrogen. Escaping hydrogen constitutes an explosion hazard. The hydrogen fluoride, due to its corrosive nature, is hazardous to both equipment and personnel.

Screw feeder valves also occupy an excessive amount of space within an operating area where space is normally a critical factor. In the instant operation, it is especially important that the powder removal equipment be sufficiently compact so as to be amenable to enclosure within a gas-tight housing. This design feature is desired in order to contain escaping gases, either from the routine customary leaks associated with conventional powder removal equipment and/or inadvertent seal failure resulting in a large release of toxic and dangerous gases.

Applicants with a knowledge of these problems of the prior art have for an object of their invention the provision of a powder valve for the controlled withdrawal of powder while inhibiting the escape of gaseous reactants and/or products during withdrawal of powder.

Applicants have as another object of their invention the provision of a powder valve that occupies a minimum of space, is simple and reliable, and is easy to maintain.

Applicants have as a further object of their invention the provision of a powder dispenser for $UF_4$ which inhibits moisture pickup from the air that would result in hydrolysis.

Other objects and advantages of our invention will appear from the following specification and accompanying drawings, and the novel features thereof will be particularly pointed out in the annexed claims.

The present invention, by means of a horizontally oriented rotatable table positioned contiguous to the open end of a vertical tower reactor, utilizes the accumulated powder produced within the reactor to form a "powder seal" of the powder itself. The clearance between the base of the reaction tower and the horizontal table is regulated to permit controlled leakage of the powder from between the base of the tower and the table, when rotated. The diameter of the horizontal table is sufficiently larger than the diameter of the reaction tower so as to provide an annular shelf outside the reaction tower. The flowing powder accumulates on this shelf and is scraped therefrom into a powder receiver. In this way, the powder itself forms a seal against external release of the gaseous reaction products from the reaction tower while simultaneously being removed in a controllable manner.

Figure 1:
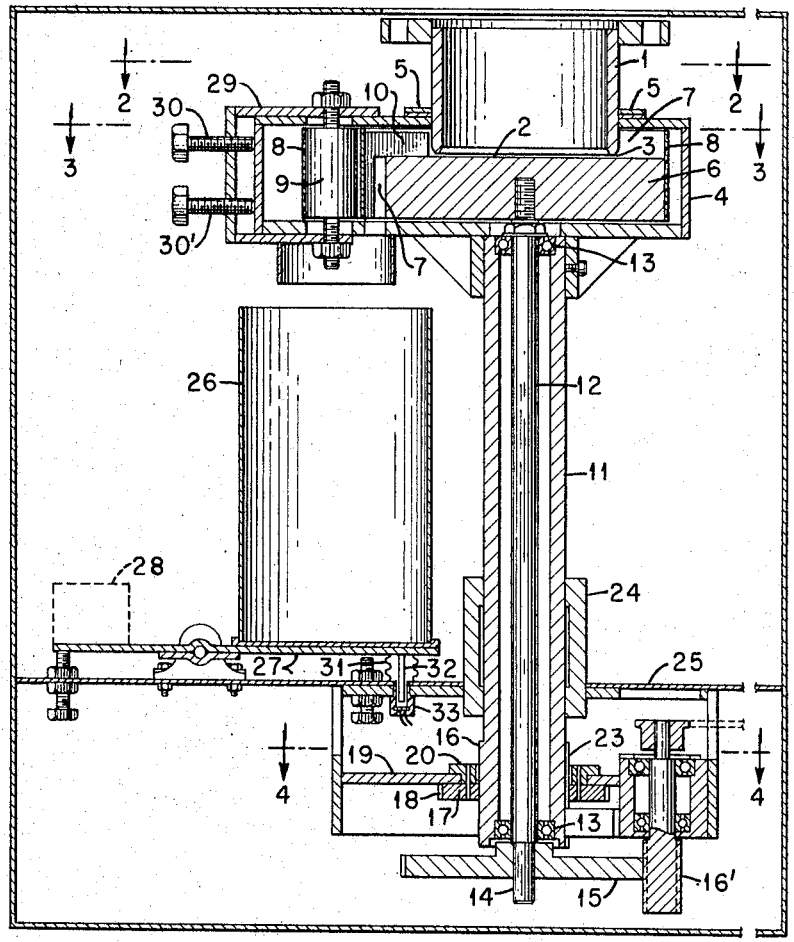
FIG. 1 is a sectional elevation of our improved powder dispenser.

Referring to the drawing in detail, and particularly to FIG. 1, 1 designates the lower portion of a tower reactor having its bottom end 2 open and its wall at said open end forming a rim lying in substantially a horizontal plane. The extreme lowermost end of tower 1 is encompassed by a housing 4. Dust seals 5 are provided for sealing housing 4 about tower 1. Within housing 4 is contained a horizontal circular table juxtapositioned to rim 3 of tower 1. As may be seen in FIG. 1, table 6 forms a movable bottom to tower 1. Thus, powder produced within tower 1 will fall to the bottom and accumulate on table 6 and within the confines of the tower walls so long as table 6 remains stationary.

Figure 3:
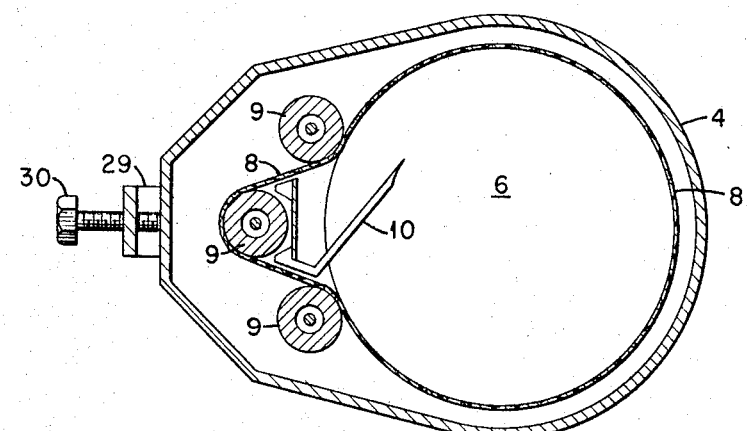
FIG. 3 is a cross sectional view taken along line 3—3 of FIG. 1.

In cooperation with housing 4, a belt 8 is provided about the major portion of the circumference of table 6 and is substantially wider than the thickness of table 6 to define a powder receiving area 7 outside tower 1 and within housing 4. Belt 8 engages the circumference of table 6 at all points except for a small portion where the belt is pulled away from the circumference and passed over a series of idler rollers 9, as shown in FIG. 3. Within the areas defined by housing 4 and belt 8 is contained a scraper blade 10 rigidly secured and extending horizontally over the upper surface of table 6 from its circumference inwardly to the wall of tower 1. Scraper 10 effectively encloses the vertical distance from the top of table 6 to the upper cover of housing 4.

Table 6 is rotatably held within a vertical sleeve 11 encapsulating a shaft 12 secured to rotary table 6. Bearing 13 located at the upper end of sleeve 11 rotatably supports shaft 12 within said sleeve. The lowermost end 14 of shaft 12 is fitted with a spur gear 15 which in turn engages a gear 16 driven by motor means (not shown).

Figure 4:
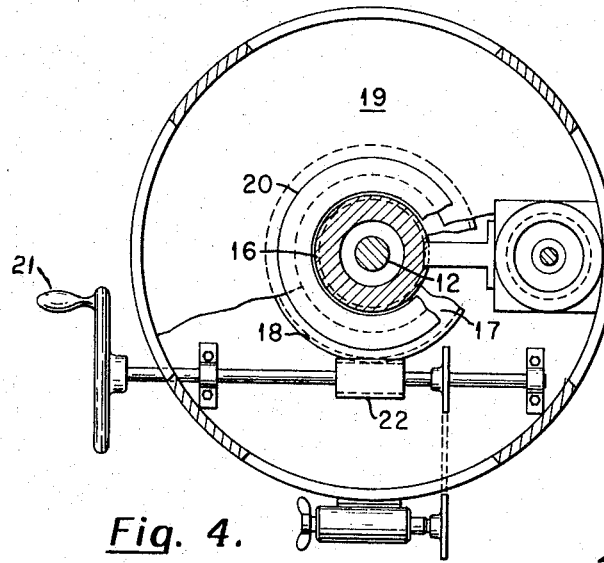
FIG. 4 is a cross sectional view taken along line 4—4 of FIG. 1.

As depicted in FIG. 1, sleeve 11 stands vertically and coaxial with tower 1. The lowermost portion of sleeve 11 is provided with external threads 16 encircling the lower end of the sleeve 11. Engaging said threads 16 is an internally threaded gear 17 which is also provided with external threads 18. As shown in FIG. 4, gear 17 is secured, rotatably in its horizontal plane, to a housing member 19 by means of a gear retaining ring 20 having an annular shoulder spatially located from gear 17 so as to receive housing member 19 therebetween. To effect vertical movement of sleeve 11, gear 17 is manually rotated, as shown in FIG. 4, by means of a hand wheel 21 operating a worm gear 22 which engages the external threads 18 of gear 17. Sleeve 11 is provided with a key 23 precluding rotation of sleeve 11. Therefore, when gear 17 is rotated, sleeve 11, not being rotatable, is forced upward or downward depending upon the direction of rotation of gear 17. Further support for sleeve 11 is provided by dust seals 5 at the uppermost portion of housing 4 which in turn is secured to sleeve 11. Still further support is provided by a seal means 24 intermediate the ends of sleeve 11 and sealably securing sleeve 11 to the wall of a dry box 25 which is provided to encapsulate the above apparatus, except the upper portion of tower 1.

In operation the powder accumulating in the lowermost portion of tower 1 and residing on top of table 6, and within the confines of tower 1, may be caused to flow in a controllable manner between rim 3 of tower 1 and the top of table 6 by regulating the proximity of table 6 to rim 3 and rotating table 6. Powder passing between rim 3 and table 6 flows onto that portion of table 6 exterior to reactor 1, and is scraped therefrom by scraper 10 to fall from the powder-receiving region 7 into a receptacle 26 therebelow.

Figure 2:
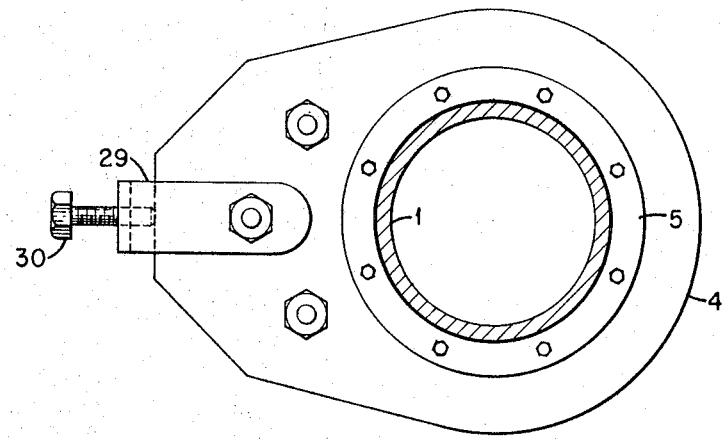
FIG. 2 is a cross sectional view of our improved dispenser taken along line 2—2 of FIG. 1.

Within dry box 25, and directly beneath the powder-dispensing portion of housing 4, is located a receptacle 26, mounted on one end of a balanced support 27. The opposite end of support 27 is provided with a weight 28 equivalent to the desired quantity of powder to be accumulated in receptacle 26. When the mass of the powder accumulating within the receptacle 26 exceeds the mass of weight 28, the receptacle 26 forces its end of support 27 downwardly actuating the plunger 32 of a switch means 30 encased within bellows 31, which in turn controls the drive (start or stop) means for rotating table 6. FIG. 3 depicts the belt 8 residing on the circumference of table 6 and the idler rollers 9. Also, the position and configuration of the scraper blade 10 is shown. FIGS. 1, 2, and 3 should all be consulted for the mode employed for maintaining belt member 8 taut against the circumference of table 6. This mode may be seen to comprise a yoke member 29 engaging the ends of a single idler roller 9 and extending laterally to the edge of housing 4. Two screws 30 and 30' are provided for exerting a lateral force against yoke member 29 to thereby position idler roller 9 and thus pull belt 8 taut.

Having thus described our invention, we claim:

1. A powder dispenser comprising a vertical reactor shell having a lower open end for carrying out a powder producing reaction, a rotatable table positioned beneath, and in close proximity to, the lower end of the shell and projecting beyond the walls thereof for closing it as powder accumulates thereon, an idler roller positioned in spaced relation to the table, a belt of greater height than the table for coupling it to the idler roller, a scraper positioned above the exposed upper surface of the table for guiding the flow of powder therefrom, means for rotating the table to dispense powder from the reactor, a container positioned beneath the table to collect the powder, a balance for supporting the container and movable in response to a predetermined load therein, and switch means actuated by the balance for stopping the means for rotating the table.

2. A powder dispenser comprising a vertical shell having an open lower end, a rotating disc having a greater diameter than the lower end of the shell positioned beneath it and in close proximity thereto, means for adjusting the clearance between the shell and the disc to regulate the passage of powder between them, a roller in spaced relation to the disc, a belt of greater width than the thickness of the disc for joining the disc and roller to define the confines of the powder and direct it to the space between the roller and disc, a powder receptacle beneath the disc, and electrical means responsive to a predetermined mass of powder in the receptacle to interrupt the rotation of the disc.

References Cited by the Examiner
UNITED STATES PATENTS

| 570,108 | 10/1896 | Smyser | 177—120 X |
| 2,930,569 | 3/1960 | Peterson | 177—120 |

FOREIGN PATENTS

| 407,902 | 2/1924 | Germany. |
| 596,546 | 4/1934 | Germany. |

RICHARD B. WILKINSON, *Primary Examiner.*

G. H. MILLER, *Assistant Examiner.*